July 19, 1949.    J. O. PORTEOUS    2,476,383
PLANETARY PISTON DISPLACEMENT MECHANISM
Filed Dec. 22, 1945    3 Sheets-Sheet 1
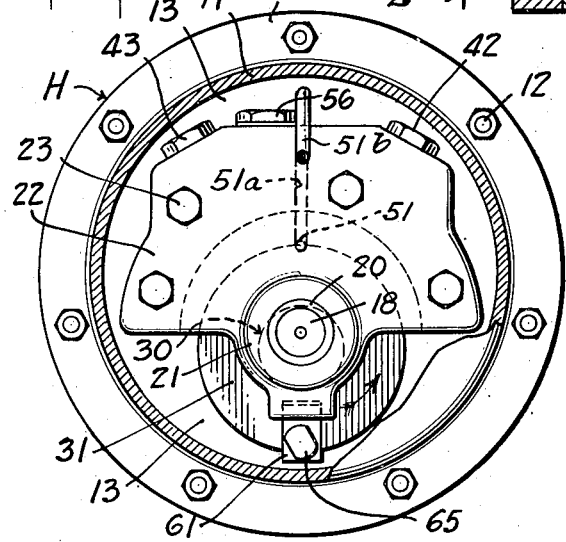
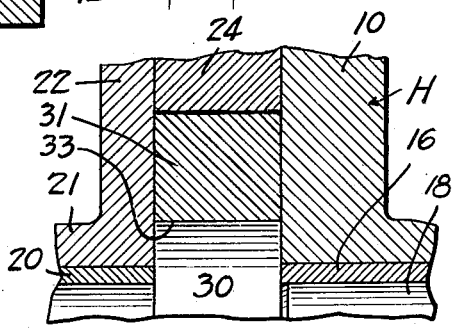
INVENTOR.
JOHN O. PORTEOUS
BY
Frederick Diehl
ATTORNEY

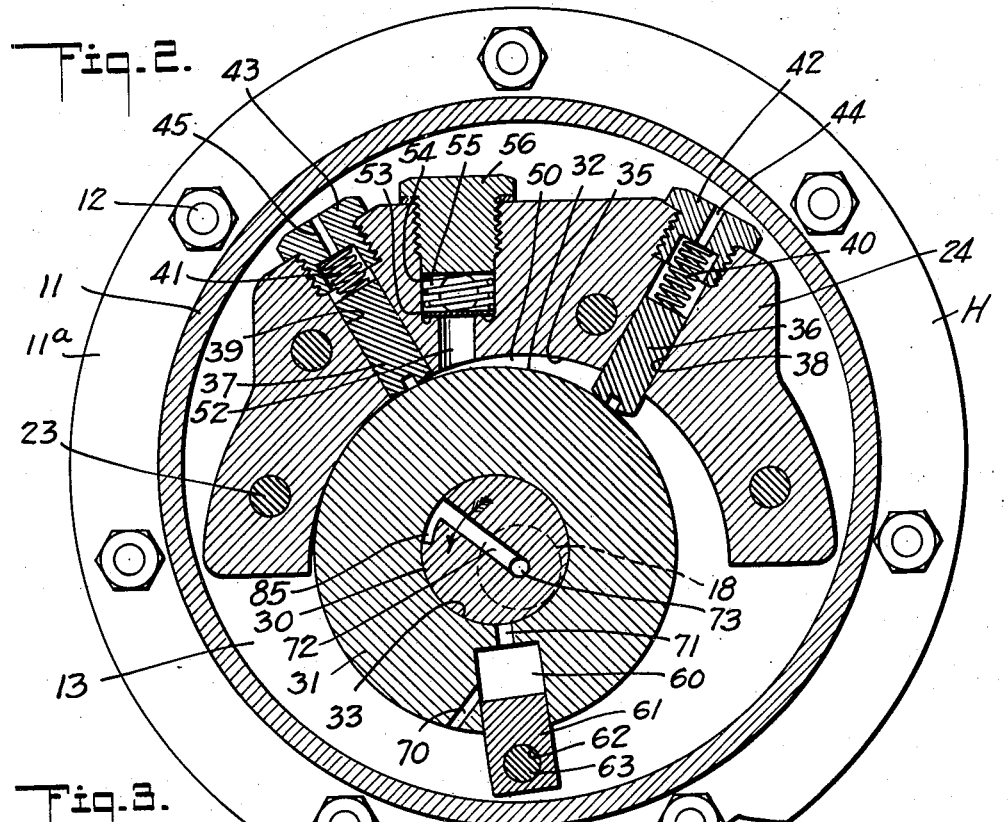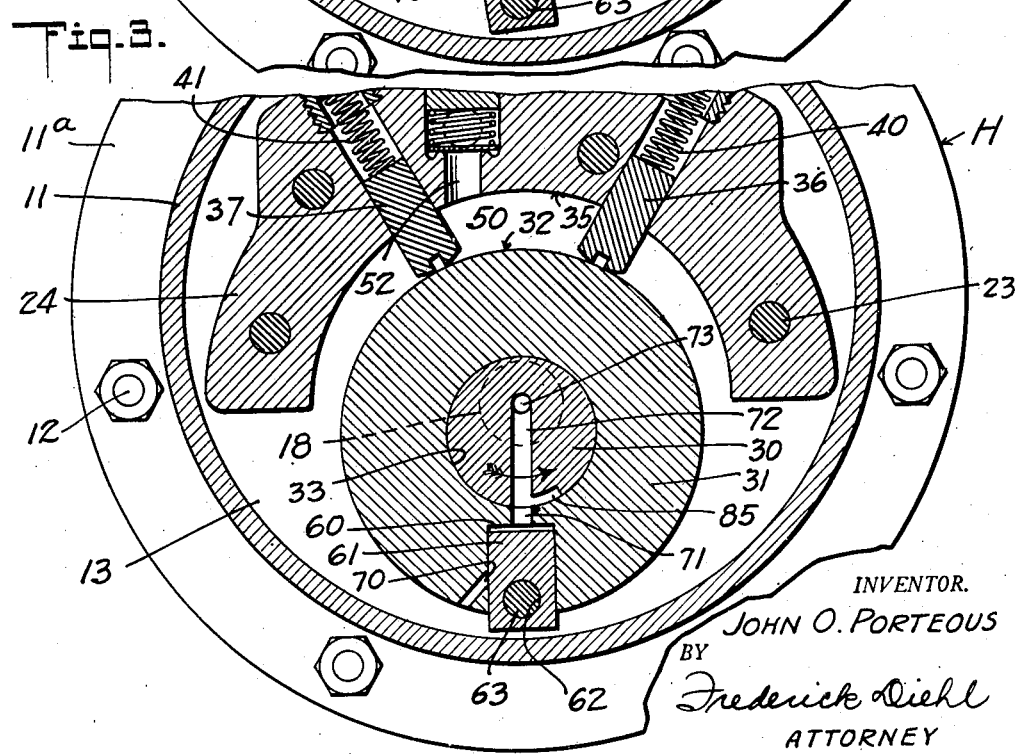

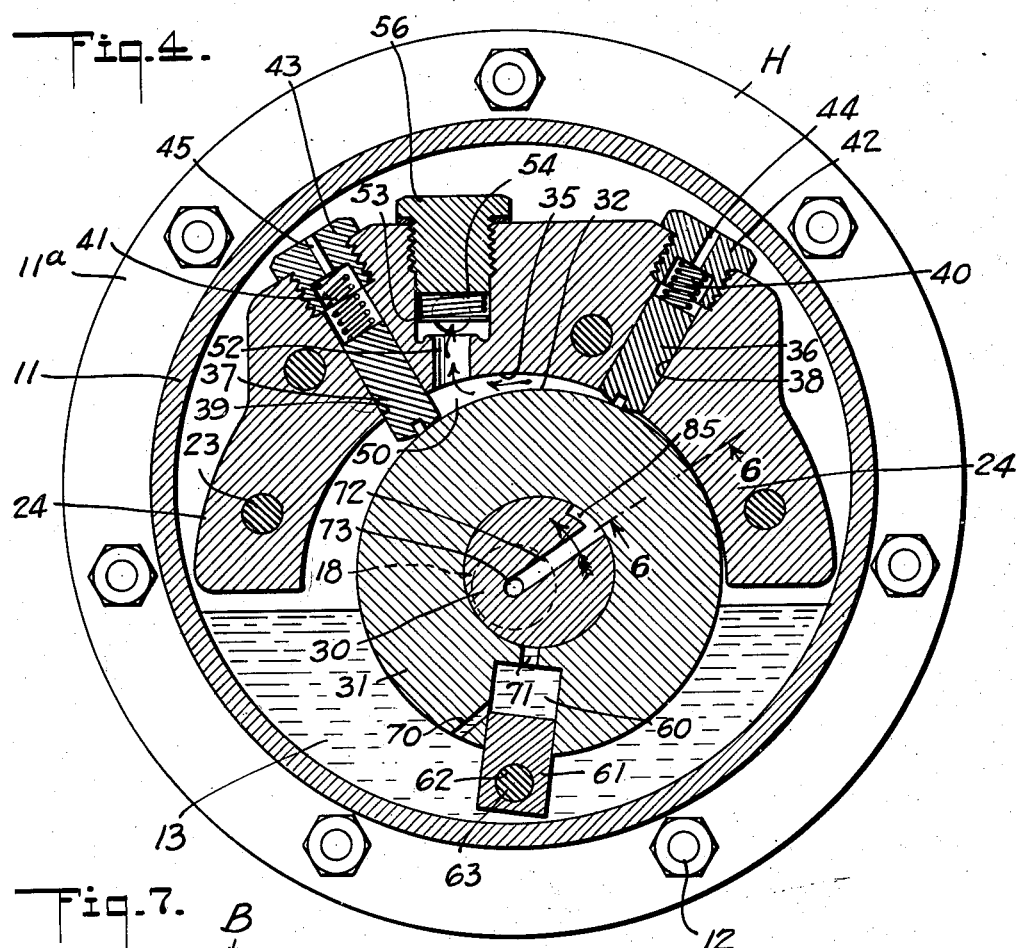

Patented July 19, 1949

2,476,383

UNITED STATES PATENT OFFICE 2,476,383

PLANETARY PISTON DISPLACEMENT MECHANISM

John O. Porteous, Pasadena, Calif.

Application December 22, 1945, Serial No. 636,747

7 Claims. (Cl. 230—147)

This invention relates generally to fluid displacement mechanisms, and more particularly to pumps, compressors and similar devices.

An object of the invention is to provide a device for developing fluid pressure in fluid circulating and static systems, which is characterized by high volumetric efficiency; simplicity of construction with a minimum number of parts; dependable operation with negligible maintenance over extended periods of time; automatic pressure lubrication of its working parts to reduce wear to a minimum; and freedom from leakage of lubricant and the fluid being pumped.

Another object of this invention is to provide a fluid displacement device of the above described character whose fluid-tight seal for the operating or drive shaft of the device is arranged at the low pressure side thereof so as to obviate the present common failure of this type of shaft seal which is required to be installed at the high pressure side of various devices heretofore proposed.

A further object of the invention is to provide a fluid displacement device in which any fluid and lubricant which may reach the shaft seal, will be collected to effect its return to the lubricant reservoir of the device.

Still another object of the invention is to provide a fluid displacement device, which, in its more specific aspect, includes a piston having a peripheral working surface and being mounted on a cam of the operating shaft, with the axis of the piston eccentrically related to the axis of such shaft and with the piston compelled to oscillate through a predetermined angle about an axis eccentrically related to the shaft axis, as the piston is driven by the cam, to the end of effectively dampening mechanical vibration resulting from the eccentrically mounted unbalanced piston, and with the piston operatively related to an induction port to control same in a manner to admit fluid to a working chamber between vanes riding on the periphery of the piston, for pumping of fluid from the low pressure side of the device through the working chamber.

A still further object of the invention is to provide a fluid displacement device whose working parts as above described are exposed to the cooling effect of gas entering the low pressure chamber of the device, whereby to obviate any and all extraneous cooling means for the working parts and yet insure a cool running condition of the device irrespective of continuous and sustained operation.

With these and other objects in view, the invention resides in the combinations, arrangements and functional relationships of elements as set forth in the following specification and particularly pointed out in the appended claims.

In the accompanying drawings,

Figure 1 is a longitudinal axial sectional view of one form of fluid displacement device embodying this invention;

Figure 2 is a transverse sectional view taken on the line 2—2 of Figure 1;

Figures 3 and 4 are views similar to Figure 2 and illustrating positions of the piston progressively advanced from that shown in Figure 2;

Figure 5 is a reduced scale view of the fluid displacement device in front elevation with a portion of the housing in section to expose interior mechanism;

Figure 6 is a fragmentary detail sectional view taken on the line 6—6 of Figure 4; and Figure 7 is a diagrammatic view illustrating movements of the piston.

Referring specifically to the drawings, the invention in its present embodiment comprises a housing H composed of a support 10 and a cover 11, the support being in the form of a disk, and the cover being a cup having a flange 11a receiving bolts 12 which pass through the support to rigidly secure the latter and cover together for co-action in defining a low pressure chamber 13 having an inlet 14 for fluid to be circulated by the device.

The support 10 is provided eccentrically thereof with a hub 15 supporting a bearing 16 in which is rotatably mounted one journal 17 of an operating or drive shaft 18 whose other journal 19 is rotatably mounted in a second bearing 20 supported in the hub 21 of a bearing member 22. Cap screws 23 pass through the bearing member 22 and through a stator member 24, and are threaded into the support 10 to rigidly secure such members to the support with the bearing member spaced from the support by the stator member, and the confronting flat surface 25 and 26 (Figure 1) of the respective members in parallelism and perpendicular to the axis of the shaft 18.

Fixed to or formed integral with the shaft 18 between its journals 17 and 19 is a cam 30 in the form of an eccentric disk whose axis is eccentrically related to the shaft axis, and whose width or face is such as to provide a working fit between the surfaces 25 and 26. A piston 31 in the form of a disk having a peripheral working surface 32 is also provided with a central bore 33 receiving the cam so as to mount the piston thereon for movement eccentrically by the cam in a circular path about the axis of the shaft 18 as a center.

The stator member 24 is generally segmental, and more specifically semi-circular in plan to provide an internal annular working surface 35 whose center is coincident with the axis of the shaft 18. Vanes 36 and 37 are mounted in radial slots 38 and 39 respectively, in the stator member 24, and are urged by coil springs 40 and 41 into wiping engagement with the peripheral working surface 32 of the piston 31. The springs 40 and 41 are interposed between the vanes and removable plugs 42 and 43 screwed into the stator member 24 and provided with breather passages 44 and 45 which prevent air pressure from being built up behind the vanes as the latter work in the slots 38 and 39.

The piston 31 and vanes 36 and 37 are of such width as to have a working fit between the surfaces 25 and 26, and co-act with the support 10, bearing member 22 and stator member 24 to define a working chamber 50 having an inlet 51 and an outlet 52. The inlet 51 is in the form of a piston-controlled port (Figures 1 and 5) in the bearing member 22, communicating with a duct 51a in the member, to which is connected one end of an induction pipe 51b, the other end of which is co-axially related to and slightly spaced from the inlet 14 of the low pressure chamber 13, all to the end of protecting the port 51 against the entry of lubricant from the chamber 13 with the fluid being pumped.

The outlet 52 is located in the stator member 24 adjacent the vane 37 and is controlled by an outwardly opening check valve 53 normally urged to close the outlet by a spring 54 arranged in a chamber 55 and bearing against the valve and against a removable plug 56 screwed into the chamber. From the chamber 55 lead registering passages 57 and 58 (Figure 1) in the stator member 24 and support 10, respectively, through which fluid is forced from the working chamber 50 into a pipe 59 which can form part of a fluid circulating or delivery system.

The piston 31 is provided with a radial slot 60 slidably receiving a guide member 61 in the form of a rectangular metal block having a bore 62 receiving the shank of a pin 63 reduced and threaded at one end 64 and provided with a head 65 at its other end. The pin is rigidly screwed into a bore 66 in the support 10 and mounts the guide member 61 for pivotal movement about an axis parallel to and eccentrically of the axis of the shaft 18 so as to control movement of the piston 31 on the cam in a manner to be later described.

In practice, the low pressure chamber 13 is supplied with lubricant whose level is approximately indicated in Figure 4 so that the lower portion of the piston is immersed in the liquid. Lubricant from this supply is automatically delivered to working parts and surfaces of the device, and to this end the portion of the slot 60 between its closed inner end and the guide member 61 constitutes a pump chamber having an inlet port 70 controlled by the guide member, and an outlet port 71 adapted to register at a predetermined position of the cam 30 in the cycle of operation, with a radial passage 72 in the cam, communicating with an axial passage 73 in the shaft 18. Lateral passages 74 and 75 in the shaft 18 lead from the axial passage 73 to circumferential channels 78 and 79 in the bearings 16 and 20, for the distribution of lubricant to all working parts.

The guide member 61 functions as a piston so as to provide a pump operable to draw lubricant from the low pressure chamber 13 through the inlet port 70 into the slot 60 when the port is momentarily uncovered by the guide member, following which the guide member closes the inlet port and forces the charge of lubricant from the slot 60 through its outlet port 71 into the radial passage 72 which registers with such outlet port at the proper time, and whose communication with the outlet port is prolonged by a circumferential extension 85 of the passage 72 as shown in Figure 3.

The outer end of the shaft 18 passes through a shaft seal (Figure 1) comprising a chamber 90 surrounding the shaft 18 in the outer end portion of the hub 15 and freely receiving an elastic sealing member 91 mounted on the shaft in a metal cup 92 and urged by a coil spring 93 in one direction to maintain an annular bearing surface 94 on the cup in engagement with an annular bearing surface 95 in a gland nut 96 threaded at 97 on the hub 15 and freely receiving the shaft. The spring 93 is interposed between thrust washers 98 and 99, one of which seats against a shoulder 100 on the shaft 18, and the other of which seats against the sealing member 91 to press the latter into sealing engagement with the shaft. Any lubricant which reaches the chamber 90 is prevented from accumulating therein by the provision of a passage 101 which places the chamber 90 in communication with the low pressure chamber 13 for the return of accumulated lubricant thereto, thus augmenting the action of the seal in preventing leakage of lubricant from the housing H around the shaft 18.

The operation of the invention is as follows:

Let it be assumed that the inlet 14 and the outlet pipe 59 are respectively connected to the low and high pressure sides of a refrigerator system for the compressing and circulation of a refrigerant therein by the device. With the working parts of the device in the positions shown in Figure 2, and with the shaft 18 being driven in the counterclockwise direction of the arrow by an electric motor or other prime mover (not shown), movement of the piston 31 from the position shown in Figure 2 to the position shown in Figure 3 wherein the working chamber 50 has reached its maximum capacity, has created a partial vacuum in the working chamber so that as the piston uncovers the port 51 as shown in Figures 1 and 5, fluid from the low pressure chamber 13 will be admitted directly from the inlet 14 to the working chamber so as to protect the port 51 against the entrance of lubricant with the fluid being pumped.

As movement of the piston 31 from its position of Figure 3 continues, the charge of fluid in the working chamber 50 will be compressed by the piston as shown in Figure 4, so as to be forced through the outlet 52 past the valve 53, thus completing the cycle of operation which takes place during each revolution of the shaft 18.

It will be clear that the motion imparted to the piston 31 by the combined actions of the cam 30 and guide member 61 causes a point on the peripheral surface of the piston to travel in the generally oval path B as shown in Figure 7, so that the period of vibration of the eccentrically mounted piston will be broken up and thus materially dampened so as to contribute to a smooth running mechanism.

It will be noted that the shaft seal is subjected only to low pressure due to the fact that the low pressure chamber 13 is in communication with the suction side of the unit. The only path of leakage for high pressure fluid from the working chamber 50 is between the walls 25, 26 past vanes 36 and 37. Any pressure which might escape from the working chamber 50 returns to the suction side of the unit into the low pressure chamber 13 and is repumped, so that a low pressure condition is maintained in the chamber 13 at all times during operation of the pump. Thus, the fluid sealing efficiency of the shaft seal is maintained at a maximum, and premature failure of the shaft seal as installed at the high pressure side of pumps heretofore proposed, is avoided.

Furthermore, it will be noted that as the working parts of the machine are all located in the low pressure chamber 13, they are exposed to the cooling effect of the fluid returning to the low pressure chamber through the inlet 14, thus eliminating the need for a cooling system for these parts, and protecting the parts against overheating irrespective of sustained and continuous operation of the machine.

I claim:

1. In mechanism of the class described, a housing defining a low pressure chamber having a fluid inlet; a shaft journaled in the housing; a fluid-tight seal through which said shaft projects into the chamber so as to subject said seal only to the low pressure which exists in said chamber; a piston in said chamber operatively connected to the shaft for actuation thereby; means co-acting with only a portion of the piston to define a segmental working chamber having an outlet for compressed fluid, with the remaining portion of the piston within the low pressure chamber; and means operable in response to actuation of the piston to cause the latter to pump fluid from the low pressure chamber through the working chamber.

2. In mechanism of the class described, a housing defining a low pressure chamber having an inlet; one wall of said housing having a bearing; a bearing member in said chamber; a segmental stator member spacing said bearing member from said wall; a shaft journaled in said bearing and bearing member; a cam on said shaft having an axis eccentrically related to the shaft axis; a piston having a peripheral working surface and mounted on said cam between said wall of the housing and the bearing member for co-action therewith and with the stator member in defining a segmental working chamber; means co-acting with the piston to prevent its rotation about its axis and compelling oscillatory movement of the piston about a second axis diametrically opposite to said working chamber and offset from the shaft axis, when the piston is driven by the cam; and means co-acting with the piston by which the latter effects pumping of fluid from the low pressure chamber through the working chamber.

3. In mechanism of the class described, a housing defining a low pressure chamber having an inlet; one wall of said housing having a bearing; a bearing member in said chamber; a segmental stator member spacing said bearing member from said wall; a shaft journaled in said bearing and bearing member; a cam on said shaft having an axis eccentrically related to the shaft axis; a piston having a peripheral working surface and mounted on said cam between said wall of the housing and the bearing member for co-action therewith and with the stator member in defining a segmental working chamber; means co-acting with the piston to prevent its rotation about its axis and compelling oscillatory movement of the piston about a second axis offset from the shaft axis, when the piston is being driven by the cam; vanes slidably mounted in the stator member and urged into engagement with the peripheral surface of the piston, to define the ends of said working chamber, and beyond which vanes the piston is exposed in the low pressure chamber for the free circulation of low pressure fluid therein around the piston; the bearing member having a port communicating with the low pressure and working chambers and controlled by the piston to admit fluid from the low pressure chamber to the working chamber for compressing by the piston; and a valve-controlled outlet for the working chamber through which compressed fluid is forced by the piston.

4. In mechanism of the class described, a housing defining a low pressure chamber having a fluid inlet; a shaft journaled in the housing and having a cam in said chamber; a piston having a peripheral working surface and mounted on said cam for movement of the piston in a circular path eccentrically of the shaft axis; the piston having a slot; a guide member mounted for pivotal movement about an axis offset from the shaft axis and working in said slot for co-action therewith in preventing rotation of the piston about its axis while rendering the piston free to move towards and away from said second axis; means co-acting with the piston to define a segmental working chamber in which suction and pressure are alternately induced during movement of the piston while leaving the major portion of said piston disposed in the low pressure chamber for the flow of the low pressure fluid therein around such portion of the piston; and means whereby fluid will be pumped from the low pressure chamber through the working chamber by the piston during its movement.

5. In mechanism of the class described, a housing defining a low pressure chamber having a fluid inlet; a shaft journaled in the housing and having a cam in said chamber; a piston having a peripheral working surface and mounted on said cam for movement of the piston in a circular path eccentrically of the shaft axis; the piston having a slot; a guide member mounted for pivotal movement about an axis offset from the shaft axis and working in said slot for co-action therewith in preventing rotation of the piston about its axis while rendering the piston free to move towards and away from the second said axis; means defining a segmental working chamber and including angularly spaced vanes urged into engagement with the periphery of the piston, with the portion of the piston beyond the ends of the working chamber being disposed in said low pressure chamber; means defining a port controlled by the piston to admit fluid from the low pressure chamber to the working chamber for compressing by the piston; and a valve-controlled outlet through which compressed fluid is forced from the working chamber by the piston.

6. In mechanism of the class described, a housing defining a low pressure chamber having a fluid inlet; a shaft journaled in the housing and having a cam in said chamber; a piston having a peripheral working surface and mounted on said cam for movement of the piston in a circular path eccentrically of the shaft axis; the piston having a slot; a guide member mounted for pivotal movement about a fixed axis offset from the shaft axis and working in said slot for co-action therewith in preventing rotation of the piston about its axis while rendering the piston free to move towards and away from the second said axis; means defining a working chamber of segmental form in which a corresponding portion of the piston operates during its aforesaid movements to pump fluid from the low pressure chamber through the working chamber, while leaving the remaining portion of the piston clear of the working chamber and exposed to the low pressure in said low pressure chamber; said piston having a lubricant inlet disposed to be submerged in lubricant in the low pressure chamber, and placing the latter in communication with said piston slot under the control of said guide member; the piston being provided with a lubricant outlet from said slot; said shaft having a lubricant passage adapted to place said outlet in communication with the journal surfaces of said shaft for the delivery of lubricant thereto in response to a pumping action created by said guide member in said slot.

7. In mechanism of the class described, a support having a bearing; a cover co-acting with the support to define a low pressure chamber having a fluid inlet; a bearing member; a stator member; means securing said members to the support with the stator member spacing the bearing member from the support; a shaft journaled in the bearings of the support and bearing member; a cam on the shaft spanning the space between the support and bearing member; a piston having a peripheral working surface and mounted on said cam; vanes slidably mounted in said stator member and normally urged into engagement with the periphery of the piston for co-action with the latter, the support, and said members, in defining a working chamber having an arcuate working surface of segmental form leaving the major portion of the piston clear of the working chamber and exposed to the low pressure in said low pressure chamber; the piston having a slot; a guide member pivotally mounted on the support and operating in said slot to prevent rotation of the piston about its axis as the piston is driven by the cam; means defining a port through which fluid from the low pressure chamber is admitted to said working chamber for compressing by the piston; and means defining an outlet through which fluid compressed by the piston is forced from said working chamber.

JOHN O. PORTEOUS.

REFERENCES CITED

The following references are of record in the file of this patent:

UNITED STATES PATENTS

| Number | Name | Date |
| --- | --- | --- |
| 879,213 | Tew | Feb. 18, 1908 |
| 1,482,028 | Oswald | Jan. 29, 1924 |
| 1,526,449 | Wishart | Feb. 17, 1925 |
| 1,623,315 | Kinney | Apr. 5, 1927 |
| 1,681,392 | Brause | Aug. 21, 1928 |
| 1,906,142 | Ekelof | Apr. 25, 1933 |
| 1,983,997 | Rolaff | Dec. 11, 1934 |
| 2,018,341 | Badger | Oct. 22, 1935 |
| 2,187,730 | Davidson | Jan. 23, 1940 |
| 2,335,284 | Kendrick | Nov. 30, 1943 |

FOREIGN PATENTS

| Number | Country | Date |
| --- | --- | --- |
| 19,777 | Great Britain | July 20, 1905 |